United States Patent
Geiger et al.

(10) Patent No.: US 11,792,074 B2
(45) Date of Patent: Oct. 17, 2023

(54) METHOD FOR SECURE ENROLLMENT OF DEVICES IN THE INDUSTRIAL INTERNET OF THINGS

(71) Applicants: John Geiger, Rochester, NY (US); Vinod Mukkamala, Leesburg, VA (US); Timothy Winter, Frederick, MD (US)

(72) Inventors: John Geiger, Rochester, NY (US); Vinod Mukkamala, Leesburg, VA (US); Timothy Winter, Frederick, MD (US)

( * ) Notice: Subject to any disclaimer, the term of this patent is extended or adjusted under 35 U.S.C. 154(b) by 449 days.

(21) Appl. No.: 17/163,366

(22) Filed: Jan. 30, 2021

(65) Prior Publication Data

US 2021/0184924 A1    Jun. 17, 2021

Related U.S. Application Data

(63) Continuation of application No. 15/814,171, filed on Nov. 15, 2017, now abandoned.

(Continued)

(51) Int. Cl.
*H04L 41/085* (2022.01)
*H04L 41/08* (2022.01)
(Continued)

(52) U.S. Cl.
CPC ........ *H04L 41/085* (2013.01); *G06F 16/2358* (2019.01); *G06F 21/44* (2013.01);
(Continued)

(58) Field of Classification Search
CPC ................. G06F 16/2358; G06F 21/44; G06F 2221/2101; H04L 41/085; H04L 41/0806;
(Continued)

(56) References Cited

U.S. PATENT DOCUMENTS

| 9,110,101 B2 * | 8/2015 | Pietrowicz | H04L 43/028 |
| 2007/0033644 A1 * | 2/2007 | Thomas | H04L 63/0846 |
| | | | 726/10 |

(Continued)

FOREIGN PATENT DOCUMENTS

| CA | 2856157 A1 * | 6/2013 | ......... H04L 41/0823 |
| CA | 2889986 A1 * | 5/2014 | ............. H04L 45/48 |
| WO | WO-2015068286 A1 * | 5/2015 | ........ H04W 72/0446 |

OTHER PUBLICATIONS

Palatella et al, On Optimal Scheduling in Duty-Cycled Industrial IoT Applications Using IEEE802.15.4e TSCH, IEEE Sensors Journal, vol. 13, No. 10, Oct. 2013, pp. 3655-3666 (Year: 2013).*

(Continued)

*Primary Examiner* — David R Lazaro
*Assistant Examiner* — Robert A Shaw
(74) *Attorney, Agent, or Firm* — Attentive Law Group, PLLC; Paul Ratcliffe

(57) ABSTRACT

The present invention provides a system and method for remote configuration and management of internet of thing devices, whereby applications do not need to explicitly participate in a particular configuration scheme and the application configuration and management can be performed securely and remotely while the Secure Remote Management engine is architecturally decoupled from the bearing protocols used by the remote enterprise to configure and manage the device or devices.

11 Claims, 2 Drawing Sheets

Related U.S. Application Data

(60) Provisional application No. 62/422,470, filed on Nov. 15, 2016.

(51) Int. Cl.

| | | |
|---|---|---|
| *H04W 4/80* | (2018.01) | |
| *G06F 16/23* | (2019.01) | |
| *H04W 4/70* | (2018.01) | |
| *H04L 41/0806* | (2022.01) | |
| *G06F 21/44* | (2013.01) | |
| *H04L 67/12* | (2022.01) | |
| *H04L 41/0869* | (2022.01) | |

(52) U.S. Cl.
CPC ...... *H04L 41/0806* (2013.01); *H04L 41/0889* (2013.01); *H04L 67/12* (2013.01); *H04W 4/70* (2018.02); *H04W 4/80* (2018.02); *G06F 2221/2101* (2013.01); *H04L 41/0869* (2013.01)

(58) Field of Classification Search
CPC . H04L 41/0889; H04L 41/0869; H04L 67/12; H04W 4/70; H04W 4/80
See application file for complete search history.

(56) References Cited

U.S. PATENT DOCUMENTS

| | | | | |
|---|---|---|---|---|
| 2013/0013809 A1* | 1/2013 | Vasseur | ............... | H04L 45/64 709/239 |
| 2013/0159486 A1* | 6/2013 | Vasseur | ............... | H04L 45/42 709/223 |
| 2013/0159550 A1* | 6/2013 | Vasseur | ............... | H04L 45/021 709/242 |
| 2013/0227114 A1* | 8/2013 | Vasseur | ............... | H04L 41/044 709/224 |
| 2013/0279540 A1* | 10/2013 | Hui | ............... | H04W 72/23 375/133 |
| 2014/0156819 A1* | 6/2014 | Cavgalar | ............... | H04L 12/66 709/223 |
| 2014/0222998 A1* | 8/2014 | Vasseur | ............... | H04L 41/16 709/224 |
| 2014/0281670 A1* | 9/2014 | Vasseur | ............... | H04L 45/28 714/4.11 |
| 2015/0200738 A1* | 7/2015 | Wetterwald | ............... | H04J 3/16 370/442 |
| 2015/0327261 A1* | 11/2015 | Thubert | ............... | H04W 74/085 370/336 |
| 2016/0020864 A1* | 1/2016 | Thubert | ............... | H04B 1/707 370/442 |
| 2016/0020987 A1* | 1/2016 | Wetterwald | ............... | H04L 41/04 370/252 |
| 2016/0088026 A1* | 3/2016 | Mohamad Abdul | ...... | G06F 8/65 726/1 |
| 2016/0337169 A1* | 11/2016 | Chhabra | ............... | H04L 45/28 |
| 2017/0048079 A1* | 2/2017 | Nethi | ............... | H04L 12/2836 |
| 2017/0048853 A1* | 2/2017 | Thubert | ............... | H04W 72/0446 |
| 2017/0063931 A1* | 3/2017 | Seed | ............... | H04L 67/12 |
| 2017/0289271 A1* | 10/2017 | Seed | ............... | H04L 67/141 |
| 2017/0302663 A1* | 10/2017 | Nainar | ............... | H04L 9/3247 |
| 2017/0353446 A1* | 12/2017 | Wetterwald | ............... | H04L 67/12 |
| 2018/0026891 A1* | 1/2018 | Vasseur | ............... | H04L 47/25 370/235 |
| 2021/0392604 A1* | 12/2021 | Deshmukh | ............... | H04L 12/66 |

OTHER PUBLICATIONS

Cisco Connected Grid Security for Field Area Network, Cisco White Paper, 2012 (Year: 2012).*

Kopmeiners et a, A Standardized and Flexible IPv6 Architecture for Field Area Networks, Smart Grid Last Mile Infrastructure, Dec. 9, 2011 (Year: 2011).*

RFC: 6550, RPL: IPv6 Routing Protocol for Low-Power and Lossy Networks, IETF, Mar. 2012 (Year: 2012).*

* cited by examiner

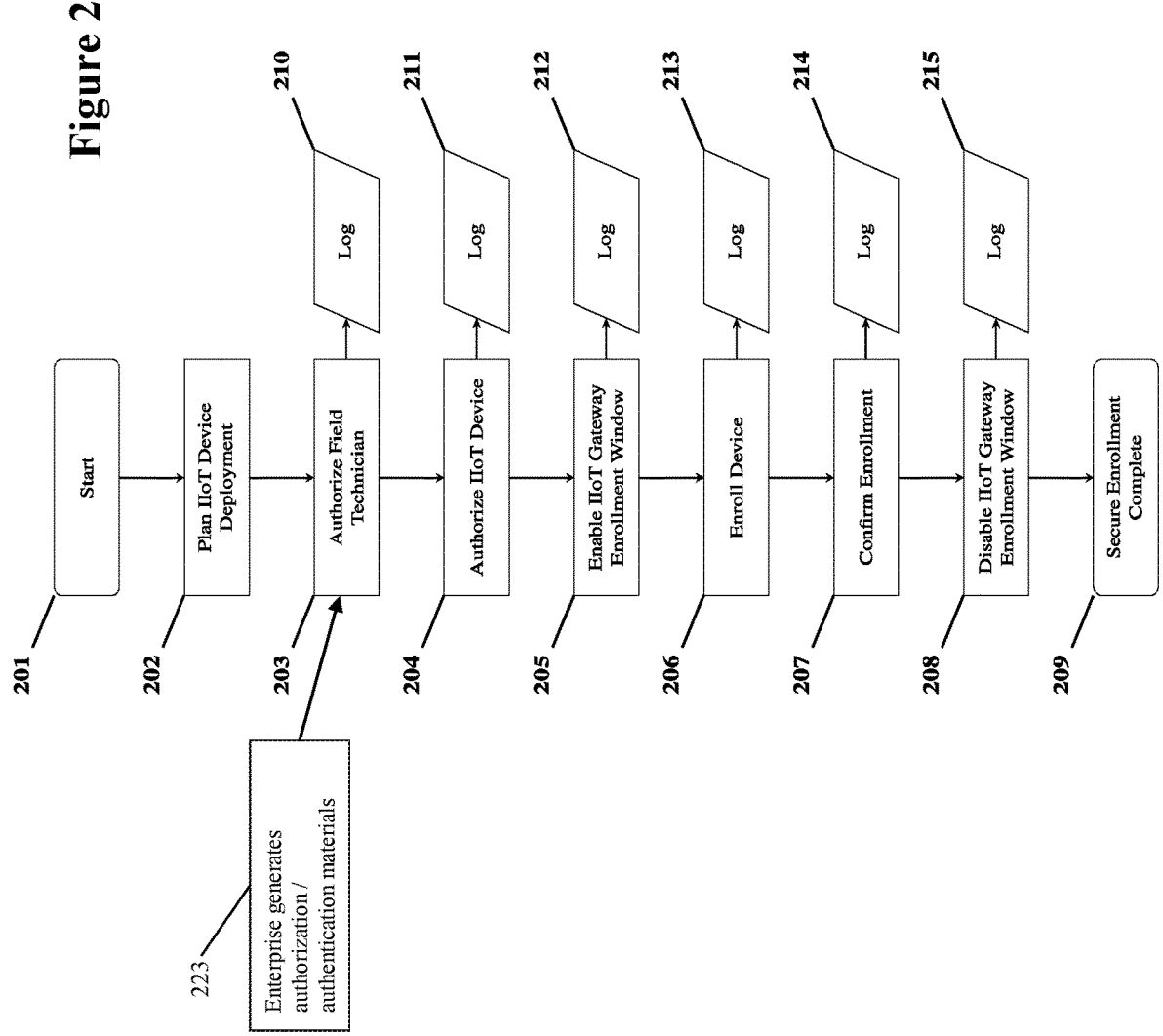

METHOD FOR SECURE ENROLLMENT OF DEVICES IN THE INDUSTRIAL INTERNET OF THINGS

RELATED APPLICATION

This application is a continuation patent application of and claims priority to U.S. patent application Ser. No. 15/814,171 filed on Nov. 15, 2017 entitled "METHOD FOR SECURE ENROLLMENT OF DEVICES IN THE INDUSTRIAL INTERNET OF THINGS", which claims priority to U.S. Provisional Patent Application 62/422,470 filed on Nov. 15, 2016, entitled "Method for Secure Enrollment of Devices in the Industrial Internet of Things", the entirety of both are incorporated herein.

BACKGROUND OF THE INVENTION

The Internet of Things (IoT) is a natural extension of the Internet and promises to leverage connectivity on a large scale to new kinds of devices that have not traditionally been able to participate in Internet Protocol (IP) networks in order to deliver new capabilities, extract new value, and support new use cases as yet to be conceived. The Industrial Internet of Things (IIoT) is the application of this paradigm to industrial networks, and is characterized by instrumenting existing industrial monitoring and control networks with new orders of magnitude of connected devices, bringing new monitoring and control capabilities into the industrial enterprise to revolutionize business processes and yield new efficiencies.

The scale of operation for IIoT systems is beyond what most traditional industrial enterprise information technology ("IT") has had to manage in the past, though the same diligence in terms of applying IT best practices to ensure secure and reliable operation must be extended into this space. Indeed, IIoT systems themselves may face compounded threats due to the potential for bad actors to attempt to impact the reliability and security of such systems, especially given that some IIoT systems will be deployed around critical infrastructure. Of the many challenges faced by enterprise IT operating IIoT systems, one is to be able to manage the devices that are able to participate in such networks. Especially considering integrating legacy technologies and short-range technologies that may not have the necessary capabilities for enterprise security management when adding or enrolling devices to the IIoT gateway, it is necessary to adopt mechanisms that will allow the enterprise a further degree of control and oversite. Legacy communication systems present a technical problem with enrolling legacy devices to IIoT networks including enrolling such devices while allowing control and security over the devices and the network. These legacy devices and networks were not designed or configured to provide the security needed or to allow enterprise or admin control over the devices. Thus, they are vulnerable to network attacks and access; as well as difficult to integrate into modern IT enterprise administrative control systems. Therefore, what is needed is a technical solution to provide protocol provisioning on legacy communication networks and devices which do not have third party provisioning control in their protocol structure.

The present invention overcomes these technical problems by providing a technical solution, as further detailed herein, as a system and method for protocol provisioning of legacy devices and secure enrollment of IIoT devices into an IIoT system, whereby the enterprise is able to play an explicit role in authorizing and managing the access of these legacy devices, in conjunction with creating a multi-communication network and device provisioning stack including detailed and auditable historical log of events, consistent with the expectations of modern IT best practices.

SUMMARY OF THE INVENTION

In traditional IT operations, there are a number of best practices and well-known techniques to permit and control access to a network, such as for example allowing a remote user to participate in a corporate network. Such deployments may for example leverage Virtual Private Network (VPN) technologies, advanced firewalling and monitoring, and capabilities for the enterprise to inspect and consider the attestation of remote devices which are attempting to access the network. Such technologies may include leveraging, for example, the Extensible Authentication Protocol (EAP), often in conjunction with Authentication/Authorization/Accounting (AAA) infrastructures. Traditional networking systems that are designed with such components give the enterprise IT actors a number of methods to manage access of remote and potentially uncontrolled devices into their enterprise IT networks. However, these traditional approaches are all characterized by the use of purpose-designed protocols and methods, often leveraging the capabilities of the Internet Protocol directly, and the nature of the use cases require little consideration of legacy devices or interoperation with other protocols that may not fully map into the enterprise IT scheme.

As an example, standard Wi-Fi systems are relatively current as they have a protocol structure, or devices (i.e. a Wi-Fi router), which employ the protocol structure which allows connectivity to the Wi-Fi network through a password. However, the network remains open to devices and connections to those who know the password. Some Wi-Fi systems allows additional aspects into the WIFI protocol which allow someone to manage the network and network devices by acting as an authorizing agent. However, this functionality is built into the protocol.

One example of a typical off-the-shelf technology that has been conscripted for IIoT use is Bluetooth. The design and implementation of the Bluetooth protocol stack, in particular the aspects of the protocol concerned with secure association, is primarily responsive to a use case that involves a sole user providing the authorization/authentication material to each device at the time of establishment of the secure association. In particular, it is quite common for the user, i.e. the field technician, to directly input a 'PIN code' into one or both of the devices that are to be securely associated. In this case there is no additional intrinsic capability within the protocol that requires the field technician nor the devices to have been authorized by a third party beyond the field technician, i.e. the enterprise. A similar situation exists in many of the other proprietary link technologies that are used within IIoT scenarios, most typically where the field technician/installer will have some knowledge of a 'pre-shared key' or other credential that is input into the devices. In many cases as a practical matter this security material may be shared between a large number of such devices, raising further concerns and risk around the implications of that material 'escaping' and causing scenarios where field devices may either be compromised without knowledge or must be pro-actively re-keyed and re-associated—which is often an expensive proposition.

However, many older or legacy networks do not have this multiple protocol or administrative functionality. For example, there are a number of proprietary short range wireless systems (i.e. Bluetooth) where these protocols for allowing easy connectivity and administrative oversight are not part of the design. Therefore, you are limited to normal protocol exchange which doesn't allow another party (i.e. an administrator) to give authorization to devices. Thus, there exists a technical problem of needing a way to provide administrative rights, ease of enrollment or connectivity of devices, and security to networks which lack these inherent protocols.

Further complicating the technical problem for industrial applications is the use of several different legacy protocols and different types of legacy devices which are employed in the same area within the industrial space. Thus, there is a need for the present invention to handle multiple legacy communication protocols and devices. These legacy protocols may differ in operation from the physical layer through the application layer, and the particulars of the protocols supported, and capabilities offered may be quite different from device to device and system to system. An IIoT architecture may include one or more field devices which communicate to an enterprise via an IIoT gateway by accessing a field area network. Many times, the field area network technology being used has some constraints for access control, and that access control is often mediated directly by the IIoT gateway. In some cases, especially when a legacy field area network technology is being utilized, there may be little basis for access control beyond 'plugging in a cable', and any additional access control must be mediated by the IIoT gateway based on higher layers of the protocol stack. In some cases, the legacy field area network may include explicit mechanisms for this, in other cases the IIoT gateway must implicitly enforce field area network access technologies by overlaying further restrictions on the allowed interactions of the legacy device, similar in concept to firewalling. In all cases, there is an IIoT device, employing a protocol technology to access a field area network, which may offer explicit or implicit access control mechanisms, as mediated by an IIoT gateway, whereby the IIoT gateway has some ability to allow or deny access to the IIoT device and by extension to allow or deny the IIoT device to participate in the IIoT system and interact with the enterprise.

Given that the IIoT gateway is capable in some manner to mediate access of an IIoT device to the field area network, and given that modern enterprise IT best practices advise some method to authorize and coordinate access to the enterprise system, it is necessary to apply a method for the enterprise IT to provision authorization and allow access for an IIoT device to the system.

An embodiment of the present invention provides a system that uploads a selected configuration to a user device, the system in the form of a tangibly embodied computer, the computer including a processor portion and system machine readable instructions on a tangibly embodied computer memory, and the selected configuration being in the form of application machine readable instructions to perform a task on the user device, the system comprising: a communication portion that communicates with the user device; the processor portion performing processing, based on system machine readable instructions, including: inputting a request including request attributes, from the user device, via the communication portion, for a configuration, the configuration constituting a selected configuration; identifying the selected configuration, in the tangibly embodied computer memory, based on the request attributes; interfacing with the user device, via the communication portion, to input user device attributes of the user device; retrieving upload data, from the tangibly embodied computer memory, based on the user device attributes; interfacing with the user device to initiate an upload transaction; generating staged changes to upload the selected configuration, including the application machine readable instructions, to the user device; confirming that the staged changes satisfy predetermined criteria, the predetermined criteria disposed in the database; committing to the staged changes; and executing the staged changes so as to upload the selected configuration, including the application machine readable instructions, to the user device, wherein the user device is provided with the selected configuration. The selected configuration may be a configuration set and the configuration set may be disposed in a SQL database of the database. The selected configuration may also be constituted by a configuration set and the configuration set may be disposed in a global registry of the database. The tangibly embodied computer memory may be a non-volatile storage and the tangibly embodied computer memory may be a database. The processor may perform a scan of the user device and the scan may identify user device configuration sets that are present in the user device. The selected configuration may be constituted by a plurality of configuration sets, whereby an application, in the user device, draws upon the plurality of configuration sets. The processor portion may form a global configuration abstraction and the global configuration abstraction may include the processor portion indexing location and access method for each of the plurality of configuration elements discovered, by the processor portion. The global configuration abstraction may be in the form of a tree, the tree including a plurality of nodes and each node may be indexed in a way that references the access mechanism for an underlying configuration element, and the position of the node in the tree fixes an unambiguous reference to that configuration element. Further, the processor portion annotating the global configuration abstraction with a security policy. The security policy may dictate roles and operations allowed on elements within the global configuration abstraction. The processor portion may include a security component, the security component performing validation related processing for the selected configuration. The security component may perform validation related processing for the selected configuration including application of a security policy and the security policy may dictate roles and operations allowed. Further, the user device may be smart phone and the communication portion may communicate with the user device over a network.

The present invention also provides a method to upload a selected configuration to a user device, the method implemented by a system in the form of a tangibly embodied computer, the computer including a processor portion and system machine readable instructions on a tangibly embodied computer memory, and the selected configuration being in the form of application machine readable instructions to perform a task on the user device, the method comprising: inputting, by the processor portion, a request including request attributes, from the user device, via the communication portion, for a configuration, the configuration constituting a selected configuration; identifying, by the processor portion, the selected configuration, in the tangibly embodied computer memory, based on the request attributes; interfacing, by the processor portion, with the user device, via the communication portion, to input user device attributes of the user device; retrieving, by the processor portion, upload data, from the tangibly embodied computer memory, based on the user device attributes; interfacing with the user device to initiate an upload transaction; generating, by the processor portion, staged changes to upload the selected configuration, including the application machine readable instructions, to the user device; confirming, by the processor portion, that the staged changes satisfy predetermined criteria, the predetermined criteria disposed in the tangibly embodied computer memory; committing, by the processor portion, to the staged changes; and executing, by the processor portion, the staged changes so as to upload the selected configuration, including the application machine readable instructions, to the user device, wherein the user device is provided with the selected configuration. Further, validating, by a security component associated with the processor portion, the selected configuration. Further, the validation including applying a security policy and the security policy may dictate roles and operations allowed.

The present invention provides a method for secure device enrollment into IIoT systems, comprising of a sequence of operations that are employed in coordination between an Enterprise, an IIoT gateway, and an IIoT Device, in the context of a field area network technology shared in common between the IIoT gateway and the IIoT device, whereby the IIoT gateway takes an explicit role to manage access control of the IIoT device to the field area network, whereby that method described by that sequence of operations enables: an Enterprise to explicitly authorize an IIoT device to be enrolled into or disenrolled from an IIoT system via access to a field area network as coordinated by an IIoT gateway; an Enterprise to provision authorization to an IIoT gateway on behalf of an IIoT device, whereby that authorization may include field area network technology specific identity and security information elements to the extent that those elements are meaningful either in terms of the ability of the IIoT gateway to explicitly employ those elements in conjunction with access primitives supported by the field area network technology, or implicitly employ those elements to impose access primitives overtop of the capabilities of a field area network technology, or some combination thereof; an IIoT gateway to engage in procedures to explicitly allow an IIoT device to participate in a field area network, thus causing the IIoT device to be enrolled in the field area network, per the provisioning information given by the enterprise, or an IIoT gateway to explicitly engage in procedures to implicitly allow an IIoT device to participate in a field area network, by enforcing access policies beyond the intrinsic capabilities of the field area network technology, or a hybrid thereof; an IIoT gateway to engage in procedures to explicitly disallow an IIoT device to participate in a field area network, thus causing the IIoT device to be disenrolled from the field area network; and an IIoT gateway and an enterprise to create logs to audit and verify the steps taken during the secure enrollment method. The system and methods further enable the enterprise to explicitly enable and disable a mode of operation whereby the IIoT gateway will allow the field area network to enable enrollment of new devices, and whereby the IIoT gateway will operate the underlying primitives of the field area network to complete the enrollment process. In addition, the system and methods further enable, a field technician to be authorized and to participate in the enrollment of the IIoT device into the network, whereby the field technician may additionally take some authorized actions particular to the field area network technology as required to complete the secure enrollment method.

BRIEF DESCRIPTION OF THE DRAWINGS

The following detailed description of the invention is maybe better understood when read with reference to the drawings in which:

FIG. 2 depicts a flow diagram of the secure enrollment method.

DETAILED DESCRIPTION

Figure 1:
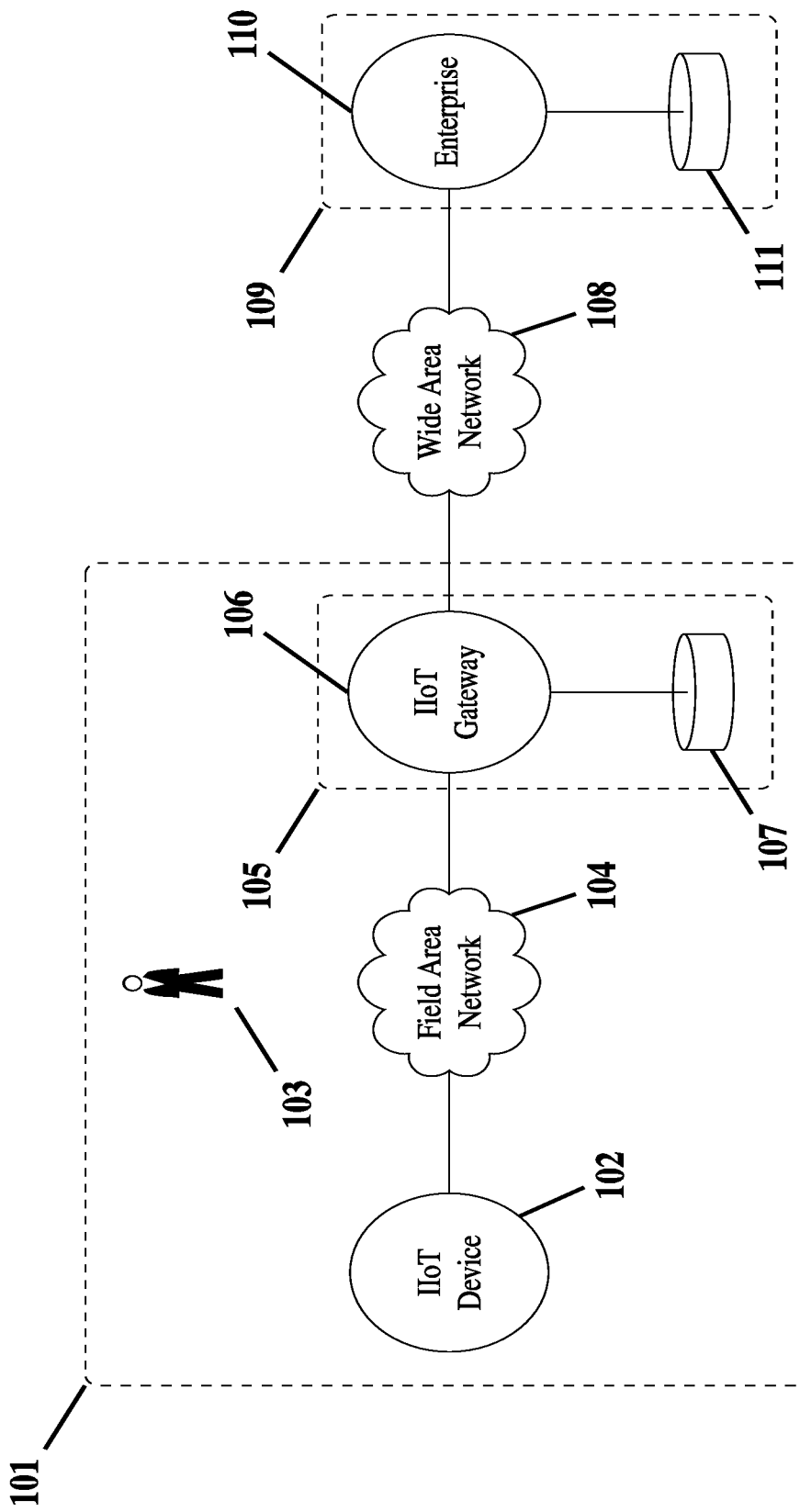
FIG. 1 depicts a system diagram of an illustrative embodiment of an IIoT Field Deployment scenario, in which an IIoT device is to be securely enrolled in a Field Area Network controlled by an IIoT gateway, as facilitated by a Field Technician in coordination with an Enterprise system.

Depicted in FIG. 1 is a diagram of a representative system employing the invention comprising a field component (101) and an enterprise component (109).

The field component comprises one or more IIoT devices (102), communicating with an IIoT gateway (105), via one or more communications technologies which comprise a Field Area Network (104). This embodiment illustrates the method utilized to securely enroll 1 IIoT device utilizing 1 communication technology to securely enroll the IIoT device into a field area network coordinated by one IIoT gateway in conjunction with 1 Enterprise/Head-End controller; though the general invention is extendable to apply to a plurality of devices, field area network technologies, and IIoT gateways in conjunction with an Enterprise. The Enterprise component 109 comprises an Enterprise IT system which includes a component to manage secure enrollment (110) along with a persistent storage component (111) that is capable to configure secure enrollment policy, manage the secure enrollment method, and log all aspects of the secure enrollment process for posterity.

The field component is in communication with the enterprise component via a wide-area-network (WAN) technology (108), which allows for a secure bidirectional communications channel between the enterprise and the IIoT gateway. The WAN technology may be implemented using a variety of mechanisms which provide bi-directional communications, most typically supporting Internet Protocol (IP) technologies, where the WAN itself may utilize technologies, for example, such as cellular, Ethernet, Wi-Fi, fixed wireless, VSAT, or a hybrid of these and/or other communications technologies. It is practically required that the communications over the WAN between the Enterprise and the IIoT gateway be secured, using mechanisms well known in the art, though the details of those security mechanisms are beyond the scope of this invention and do not impact directly the applicability of this invention.

The Field Area Network (104) is most typically implemented by an access technology that incorporates wireless or wired communications, whereby that field area network technology generally allows communications between participating endpoints in a point-to-point, point-to-multipoint, or mesh network configuration; and further whereby it is required for the participating devices in the field area network to engage in some enrollment procedure, most typically though not necessarily involving the provisioning of one or more secure access credentials. The secure enrollment method typically involves the establishment/validation of a secure and authenticated relationship between the participating IIoT device (102) and the IIoT gateway (106), whereby that secure relationship produces artifacts that can subsequently be autonomously utilized by the IIoT Device to provide authenticated and confidential access to the field area network, enabling bidirectional communications between the IIoT device and the IIoT gateway utilizing the field area network. An IIoT device that has completed the secure enrollment method is in an 'enrolled' state, and the IIoT device and the IIoT gateway may reference artifacts produced as a consequence of establishing the 'enrolled' state to autonomously establish and re-establish secure bidirectional access to the field area network as necessary to engage in direct communications, and by extension to allow the IIoT device to communicate with the Enterprise as well as other devices that it may be authorized to interact with in the field area network. An IIoT device that has not completed the secure enrollment method, or that has completed the secure enrollment method but subsequently been placed into a 'dis-enrolled' state is not able to participate in the field area network, is not able to have full access to bidirectional communications with the IIoT gateway, and is by extension not able to communicate directly or indirectly with the enterprise. A device which is not previously known to the field area network is by default in a 'dis-enrolled' state. The IIoT gateway includes persistent storage (107) which records knowledge of the state of devices which have been securely enrolled, including the necessary artifacts of the secure enrollment procedure have been produced and serve as the basis for the IIoT gateway to autonomously provide the IIoT Device subsequent access to the Field Area Network.

One representative technology in the field area network might be Bluetooth or Bluetooth Low Energy, whereby the secure enrollment method causes a pairing process to occur, as defined by Bluetooth protocols, and a link key to be established, where the link key is part of the enrollment artifacts utilized to establish secure access to the field area network. Another representative technology in the field area network might be based on IEEE 802.15.4, whereby the successful completion of the secure enrollment method will cause a network key to be allocated into the IIoT device which is subsequently utilized by the IIoT device to provision secure access into the 802.15.4 field area network. Another representative technology in the field area network might be a protocol more typically associated with a wired technology such as DNP3 or Modbus, whereby the IIoT device is unable to fully participate in and interact with the field area network until a secure enrollment method is completed, whereby that access may be further constrained by a property including but not limited to a unique communications identifier particular to the protocol, such as a MAC address, or a IIoT device property such as a serial number. In this example the secure enrollment method is augmenting a legacy technology that may not explicitly provide for secure access mechanisms but it still being constrained by the IIoT gateway such that it cannot fully participate in the field area network until it has completed a secure enrollment method. The prior examples are only representative applications of the secure enrollment method, the general method is applicable to a number of field area network technologies that operate at the link, network, or application layer. A key point is that this invention allows a method for the secure enrollment policies to be overlaid upon an existing field area network technology, in particular to extend access to the Enterprise as a necessary participant in the secure enrollment of IIoT devices regardless of whether or not the native field area network technology explicitly includes the capability for the Enterprise to take an active role, and in particular in cases where the native field area network technology does not explicitly include the capability for the Enterprise to take an active role.

In practice an IIoT device is installed in the field area network by a field technician (103). The field technician may play an active role in the secure enrollment method, including to coordinate out-of-band with the Enterprise. Actions taken by the field technician may typically include enabling an enrollment function on the IIoT device (for example to initiate a pairing process in the case of Bluetooth), and recording and reporting parameters to the Enterprise necessary for the completion of the secure enrollment method (for example a serial number or a field area network parameter such as MAC address). All actions taken during the secure enrollment method by a field technician which trigger an observable event on the IIoT gateway or at the Enterprise are to be reported and logged at the enterprise, such that the Enterprise maintains a comprehensive and auditable history of the identity of the field technician, the actions taken by the field technician, and the outcome of those actions. The enterprise may deny the secure enrollment method to complete successfully if it is determined by an enterprise policy that the field technician is not authorized to take a required action, or if the enterprise policy determines that a particular IIoT device is to be denied access to the field area network independently of the authorization granted to the field technician.

Depicted in FIG. 2 is a flow diagram that details the secure enrollment method.

The Secure Enrollment method starts in (201), after which IIoT Device Deployment planning (202) begins. In the planning stage, it is necessary to identify the IIoT device that is to be deployed. Information about the IIoT device is collected at this stage, including any identifying characteristics that may be later enforced during the secure enrollment method, such as for example serial numbers and field area network communications parameters. The IIoT device field area network interface should be verified to be compatible with the field area network technologies supported by the IIoT gateway. At this stage, depending on the field area network technology, additional configuration and/or provisioning of credentials may be performed on the IIoT device in preparation for the deployment.

In step (202) a field technician is authorized and designated to perform the installation and assist in the secure enrollment of the IIoT device. As seen in step 223, the enterprise 109 generates authorization or authentication materials or information. Through the authentication materials, the field technician is allocated permissions and the credentials necessary to interact directly with the enterprise throughout the remainder of the process. The authorization and context of the authorization of the field technician is logged (203). The field technician may then (at some future point) proceed to the field and perform the installation of the IIoT device. The enterprise 109, in some instances, may provide a subset of authorization or authentication information (generated in step 223) to the IIOT device itself. Alternatively, the field technician may provide the authorization or authentication information to the device during or preceding enrollment.

When the IIoT device is installed, the field technician may coordinate with the enterprise to initiate the enrollment of the IIoT device into the field area network. This coordination may further involve the field technician communicating to the enterprise 109 any additional deployment information that may not have been available in (202) but is known once the IIoT device is installed to the field. The enterprise then sends any identifying and provisioning information that is necessary to complete the enrollment procedure to the IIoT gateway, and authorizes that IIoT device to be enrolled in the field area network (204). The particular information required to be sent from the enterprise to the IIoT gateway will be dependent on the specific field area network technology being used to enroll the IIoT device, but will generally include identifying information such as serial numbers, network information such as MAC addresses, and security information such as a IIoT device certificate (to the extent that the field area network directly supports such security primitives). Further, the enterprise applies the configuration to the IOT gateway. The enterprise and the IIoT gateway log that the IIoT gateway has been provisioned to allow field area network access to the IIoT device (211). However, note that the field area network enrollment mechanism has not yet been enabled. Once the steps to authorize the IIoT device in the field have been completed, the enterprise may instruct the IIoT gateway to enable the secure enrollment window (205). When the secure enrollment window is enabled, the IIoT gateway will allow for the field area network to perform the procedures necessary to allow the IIoT device to interact with it and securely join it, obtaining enduring artifacts as applicable for continued autonomous access. For example, in a Bluetooth device, the procedures necessary may include entering a pin code to allow that Bluetooth device access to the network. The activation of the secure enrollment window is logged at the enterprise and at the IIoT gateway (212).

Next the field area network procedures to enroll/attach the IIoT device are performed (206). Generally, these procedures are the field area network technology procedures that are required to allow the IIoT device to enter into bidirectional communications with the IIoT gateway via the field area network technology. An IIoT device that has not completed these procedures will not be able to fully participate in the field area network. The IIoT gateway itself plays a role in completing these procedures, which it is able to do since it has been enabled to do so in step (205). Depending on the specific field area network technology, the field technician may take an active role in initiating the field area network technology at the IIoT device to join the field area network. Depending on the field area network technology the IIoT device may take an active or passive role, and the particular network/link enrollment procedures of the field area network technology are invoked. For example, if the field area network technology is Bluetooth, the field technician may take steps to initiate a pairing procedure on the IIoT device, and the IIoT gateway may enter an active state on this Bluetooth radio to initiate and carry out the pairing procedures. Throughout the enrollment process the IIoT gateway will further condition access of the IIoT device into the field area network based on the material that was provisioned in step (204). Oftentimes, the field technician completes the final steps to verify the interactions of the device with the IIOT gateway to complete the secure enrollment. The IIoT gateway logs the steps taken during the enrollment process and reports the same to the enterprise (213).

In (207) the IIoT gateway next confirms that the IIoT device has been successfully enrolled (or not). The outcome of the enrollment procedure is logged and also reported to the enterprise (214). The outcome may also be reported to the field technician at this time by the enterprise. If the enrollment procedure was not successful, and it was expected to be successful, it may be re-attempted, possibly necessitating to start again from (204). Upon successful enrollment the enterprise may then take further action to autonomously configure the IIoT device application to perform its specific functions; the enterprise is able to communicate with the IIoT device via the IIoT gateway. The IIoT gateway will persistently store the enrollment artifacts for the IIoT device, which will allow the IIoT device to achieve autonomous and enduring access to the field area network in the future, until such a time that it may be dis-enrolled by the enterprise.

Finally, the IIoT gateway, at the successful or unsuccessful completion of the enrollment procedures, after a timeout or explicit command from the enterprise, the IIoT gateway will disable its secure enrollment window (208). No new devices may be enrolled unless/until it is enabled again. The IIoT gateway will log this event and inform the enterprise of the same (215).

The secure enrollment method is now complete (209). The device will remain enrolled unless/until it is dis-enrolled by command from the enterprise, at which point in time the gateway will purge the enduring enrollment artifacts related to the device and disallow the device to interact with the field area network.

An additional aspect of the present invention relates to the device and network driven security policy embedded at the server side in the form of a reference table. As devices are enrolled, the system tracks the preferences and configuration of the customer and each individual device. This includes whitelisting preauthorized settings, factory set credentials such as pin codes, local network passwords, customer authorized enrollment windows, and other details related to provisioning connectivity. These myriad of different devices and communication protocols create a tailored set of authentication materials for each network and device on the enterprise server side. Thus, the system provides a tailored device by device authorization procedure which enables devices to be enrolled while maintaining both the security of the network and enterprise or administrative control over the network and devices. As the enterprise changes security policy procedures, each device within the server-side table is updated to create the new procedures and protocol for such device. The security policy and related network and device table may include numerous settings and preferences including communication type, preset authorization type, defined preferences and procedures for modifying settings and preferences; and changes required to any IOT gateway to accommodate specific device enrollment. The IIoT gateway receives from the enterprise reference table when necessary the subset of authentication materials to complete secure device enrollment at the appropriate time.

The field technician is granted access to materials necessary to complete the secure enrollment of devices at an appointed day/time when the technician is expected to be at the field location. Depending on the particular device protocol the field technician may directly interact with the device to provision portions of authorization/authentication material that have been received by the technician from the enterprise. The field technician will interact with the IIoT gateway, e.g. through a Web UI interface, to complete the steps necessary for the authorized/authenticated device enrollment. The field technician may achieve 'Web UI interface' access through direct network connection to IIoT gateway, via a table/application, or by some other method dependent on the exact deployment scenario. The point is that the field technician interacts with both the device and the IIoT gateway to complete the secure enrollment process, utilizing materials that have been prepared by the enterprise to complete the setup.

One area where the present invention provides both a technical improvement and efficiency gain is to the security of the legacy devices and network. Since many of the legacy devices and networks lack provisioning control the devices and network may be more susceptible to attacks and attempts to access the network. The present invention provides multiple protocol stacks which can be integrated and entangled within these legacy networks. Thus, providing multiple levels of security provisioning over the networks and devices making them more secure and efficient in preventing unwanted access. The present invention also provides more control of the network and devices through enterprise and administrative control of the network and the network devices.

The present invention makes use of one or more stacks or communication protocols integrated or forced upon these legacy systems lacking the necessary protocol. A stack is an abstraction which comprises different layers that do different jobs or functions. In a typical internet you might have an Ethernet layer, an IP layer, and a TCP layer. In Bluetooth, for example, there is a radio layer and a layer for the radio to talk to a microprocessor and a security layer that handles security and a layer that handles multiplexing of different channels. These protocols are architected in layers in this manner and then each layer is typically governed by a state machine within a single layer. A state machine will identify who has the connection and if the connection has been secured (or not). If the connection has not been secured, then the system is configured to disallow or block access.

As previously mentioned, whitelisting is used and establishes preapproved devices or allowing only the devices with a preestablished identity to even attempt a connection. Whitelisting enables an enterprise to predetermine and preconfigure a device identity, which can be used to constrain the gateway side to not interact with any device that is not explicitly allowed.

In addition, the system can integrate an enrollment window schema, so only, devices or access to the network can happen at a certain time window. For example, if the administrator knows a field technician is going to install devices on a network, the administrator can create a window of time and commission the network (which may be a local network or only a part of the large network) and enable enrollment of devices. Through this function an administrator can remotely and securely enable an enrollment window and then at all other operational times close the network, so no new devices can be enrolled or to prevent anyone from accessing the network.

An additional mechanism for controlling access is providing or instituting how network access keys are generated and provisioned. The keys can be provisioned in such a way that they can be mutated by the enterprise, they can only be produced by the enterprise and therefore, the fact that one might know the correct key at a given day, time, and network location means that someone back at the enterprise has authorized or initiated the production of that key.

Further, such key can change for each day, time, or location.

By way of example, in Bluetooth, one common scheme is to use a pin code. One might have to look up the pin code in the manual or it might be auto set to "0000". The pin code is used to register the device to the network or other devices. The present invention can make use of a pin code function but based on enterprise authorization. The enterprise authorization might be a unique one-time pin code which can be produced with a cryptographic tie. The field technician would be informed of the pin code or codes. These pin codes could be authorized or limited to the time window and network location. Thus, the system can use multiple levels of authorization (cryptographic pin codes, time windows, network location, and field technician access). By following such a process, the network can have multiple levels to prevent unwanted access. Further, Bluetooth is only an example of the types of devices and communication networks this system can be implemented on. The present invention is especially useful for differing types of devices and communication protocols since this system integrates multiple protocol stacks or layers which are designed to interact with varying communication protocols.

In application, not only do industrial systems have piping, wiring, pumps, and actuators (as physical systems for example), they also have sensors, controls, and electronic monitoring that augment and monitor the physical systems. These additional systems participate in what the system does and how it does it. Further, when the industrial system is a sub-station or an oil rig (for example), wireless links are preferred over trenching and running conduit or cables. Therefore, wireless connectivity using short range legacy systems for connecting the sensors, controls, and monitors is prevalent in industrial settings. However, as previously mentioned, these legacy systems lack the third party (enterprise) authorization element.

One aspect of the present invention that is used for interacting with legacy devices is the use of an IOT gateway. The IOT gateway is a device which may interact with a multitude of devices relevant for the application. For example, the IOT gateway may include a Bluetooth radio, a 15.4 radio, as well as other radios for communicating with the communication protocols of the legacy devices deployed in the remote location. Further, some devices or sensors can be retrofitted with radios or wireless modems using Bluetooth or 15.4 radio signals to allow communication with the IOT gateway. Such retro-fitted devices are often called capillary devices. Oftentimes, these retrofitted modems are used in industrial settings to replace wire because it's often easier and cheaper to connect through a wireless device.

Considering the age, longevity, and cost to replace of these industrial systems, it is often preferable to keep using the legacy technologies since they are already integrated with industrial application. However, the enterprise and administrators would prefer to employ modern authorization protocols and deploy a system which bridges communications between modern devices and networks and legacy devices and networks. The system of the present invention provides the ability to administer older legacy systems.

An example of the present invention might include an electrical closet application. The closet may have a serial port which can be used to attach a monitor or reader to download data on the activity of the circuits in the panel. Through use of the present invention, an attachment to the serial port could include a communication device (i.e. a Bluetooth modem) which can transfer the data to the IOT gateway. Thus, the need to connect a reader or monitor is minimized while still enabling the readings to be transmitted by the wireless attachment (serial port attachment) to the IOT gateway and back to the administrator.

Heterogenous Network

Ultimately, the ability to enroll legacy devices enables the enterprise, and a network administrator through network software, to control access to and therefore security of a heterogenous network. Specifically, a heterogenous network is one containing both legacy devices and more modern or current network devices. As previously mentioned, legacy devices are devices which can communicate with other devices but lack the protocol structure for modern networks, network administration, and security. A modern device would be a device which has the inherent protocol. Through use of the IIOT gateway, the legacy devices can communicate with and create a sub-network with the IIOT gateway. Then, through the IIOT gateway the legacy device network can be integrated into or with a network with modern devices. The IIOT gateway acts as a technical bridge between the legacy device network and a modern device network. The enterprise can then control numerous aspects of the gateway including enrollment windows, authentication schemas, device access, and other IT administration functions for both legacy and modern devices. Thus, the present invention provides a significant technical benefit in its ability to enroll legacy devices and modern devices on the same network and its ability to control both modern and legacy devices from one enterprise system.

The systems and methods of the invention in described embodiments may be implemented as a system, method, apparatus or article of manufacture using programming and/or engineering techniques related to software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may be further implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In an embodiment of the invention, the systems and methods use networks, wherein, the term, 'networks' means a system allowing interaction between two or more electronic devices, and includes any form of inter/intra enterprise environment such as the world wide web, Local Area Network (LAN), Wide Area Network (WAN), Storage Area Network (SAN) or any form of Intranet.

In an embodiment of the invention, the systems and methods can be practiced using any electronic device. An electronic device for the purpose of this invention is selected from any device capable of processing or representing data to a user and providing access to a network or any system similar to the internet, wherein the electronic device may be selected from but not limited to, personal computers, mobile phones, laptops, palmtops, tablets, portable media players and personal digital assistants.

As noted above, the processing machine used to implement the invention may be a suitable computer or other processing machine. The processing machine may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a C SIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system (OS). Thus, embodiments of the invention may include a processing machine running the Unix operating system, the Apple iOS operating system, the Linux operating system, the Xenix operating system, the IBM AIX™ operating system, the Hewlett-Packard UX™ operating system, the Novell Netware™ operating system, the Sun Microsystems Solaris' operating system, the OS/2™ operating system, the BeOS™ operating system, the Macintosh operating system (such as macOS™), the Apache operating system, an OpenStep™ operating system, the Android™ operating system (and variations distributed by Samsung, HTC, Huawei, LG, Motorola, Google, Blackberry, among others), the Windows 10™ operating system, the Windows Phone operating system, the Windows 8™ operating system, Microsoft Windows™ Vista™ operating system, the Microsoft Windows' XP™ operating system, the Microsoft Windows™ NT™ operating system, the Windows™ 2000 operating system, or another operating system or platform.

The systems and methods of the invention may utilize non-operating systems (aka serverless architecture) as well for distributed processing. In the processing of the invention, services on cloud computing networks leveraging systems like AWS (as offered by Amazon Web Services, Inc.), BlueMix (as offered by IBM), and Microsoft Azure, can perform data collection services using varying technologies that are spun up on demand using tools like Chef to create container based deployments like Docker, or non-container compute services (e.g. AWS Lambda).

The invention may use or provide real-time analytics processing that may use scale on demand to the users in the system, in accordance with at least one embodiment of the invention. Such offerings as AWS lambda and Kinesis (as offered by Amazon Web Services, Inc.) are among those that may be used in implementation of the invention. For example, AWS Lambda may be utilized to execute code (to perform processes of the invention) in response to various triggers including data changes, shifts in system state, or particular action taken by users. Similarly, in an embodiment, the OS (operating system) of the invention might be encapsulated in an EC2 instance (as offered by Amazon Web Services, Inc.) or multiple instances for deployment.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner, such as over a network of over multiple networks. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, as also described above, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

Further, multiple applications may be utilized to perform the various processing of the invention. Such multiple applications may be on the same network or adjacent networks, and split between non-cloud hardware, including local (on-premises) computing systems, and cloud computing resources, for example. Further, the systems and methods of the invention may use IPC (interprocess communication) style communication for module level communication. Various known IPC mechanisms may be utilized in the processing of the invention including, for example, shared memory (in which processes are provided access to the same memory block in conjunction with creating a buffer, which is shared, for the processes to communicate with each other), data records accessible by multiple processes at one time, and message passing (that allows applications to communicate using message queues), for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, C#, Objective C, COBOL, dBase, Forth, Fortran, Java, Modula-2, Node.JS, Pascal, Prolog, Python, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, as also described above, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

What is claimed is:

1. A system to securely enroll a legacy device into a field area network, the system comprising:
    a server in the form of a tangibly embodied computer, the server including a server processor and server machine readable instructions on a tangibly embodied server memory;
    a gateway device in the form of a tangibly embodied computer, the gateway device including a gateway device processor and gateway device machine readable instructions on a tangibly embodied gateway device memory;
    wherein the server communicates with the gateway device, and the gateway device communicates with the server and the legacy device;
    the server processor performing processing, based on the server machine readable instructions and the gateway processor performing processing based on the gateway machine readable instructions which include:
    planning, by the server, an enrollment of the legacy device into the field area network by: (1) selecting a connection process of the legacy device to the gateway device based on the legacy device; (2) logging expected legacy device attributes on the server memory; and (3) establishing an enrollment window;
    transmitting, by the server processor communicating with the gateway device, the connection process of the legacy device to the gateway device based on the legacy device and the expected legacy device attributes;
    transmitting, by the server processor communicating with the gateway device, instructions for the gateway device on when to open the enrollment window on the gateway device, the legacy device only being able to connect to the gateway device and enroll in the field area network during the enrollment window;
    enrolling, by the gateway device, the legacy device into the field area network when: (a) the gateway device opens the enrollment window; (b) the legacy device connects with the gateway device using the selected connection process based on the legacy device; and (c) the gateway device verifies the actual legacy device attributes from the legacy device match the expected legacy device attributes transmitted by the server processor; and
    closing, by the gateway device, the enrollment window based on the enrollment window information received from the server.

2. The system of claim 1, wherein the gateway device records the legacy device secure enrollment procedure attributes.

3. The system of claim 2, wherein the gateway device communicates with the enrolled legacy device utilizing the recorded enrollment procedure attributes on the gateway device.

4. The system of claim 1, wherein the gateway device communicates with the legacy device using Bluetooth™ technology.

5. The system of claim 1, wherein the selected connection process comprises a pairing process of the legacy device to the gateway device.

6. A method to securely enroll a legacy device into a field area network, the method implemented by a server in the form of a tangibly embodied server computer, the server including a server processor and server machine readable instructions on a tangibly embodied server memory;
    a gateway device in the form of a tangibly embodied computer, the gateway device including a gateway device processor portion and gateway device machine readable instructions on a tangibly embodied gateway device memory;
    wherein the server communicates with the gateway device, and the gateway device communicates with the server and the legacy device;
    planning, by the server, an enrollment of the legacy device into the field area network by: (1) selecting a connection process of the legacy device to the gateway device based on the legacy device; (2) logging expected legacy device attributes on the server memory; and (3) establishing an enrollment window;
    transmitting, by the server processor communicating with the gateway device, the connection process of the legacy device to the gateway device based on the legacy device and the expected legacy device attributes;
    transmitting, by the server processor communicating with the gateway device, instructions for the gateway device on when to open the enrollment window on the gateway device, the legacy device only being able to connect to the gateway device and enroll in the field area network during the enrollment window;
    enrolling, by the gateway device, the legacy device into the field area network when: (a) the gateway device opens the enrollment window; (b) the legacy device connects with the gateway device using the selected connection process based on the legacy device; and (c) the gateway device verifies the actual legacy device attributes from the legacy device match the expected legacy device attributes transmitted by the server processor; and
    closing, by the gateway device, the enrollment window based on the enrollment window information received from the server.

7. The method of claim 6, further comprising the steps of: recording, by the gateway device, the legacy device secure enrollment procedure attributes.

8. The method of claim 7, further comprising: communicating, by the gateway device, with the enrolled legacy device utilizing the recorded enrollment procedure attributes.

9. The method of claim 6, wherein the gateway device transmits information to the server including information to confirm the enrollment of the legacy device.

10. The method of claim 6, wherein the gateway device communicates with the legacy device using Bluetooth™ technology.

11. The method of claim 6, wherein the selected connection process comprises a secure connection process of the legacy device to the gateway device.

* * * * *